(12) United States Patent
Moon et al.

(10) Patent No.: US 9,825,493 B2
(45) Date of Patent: Nov. 21, 2017

(54) INTERIOR PERMANENT MAGNET SYNCHRONOUS MOTOR

(71) Applicant: Hyundai Motor Company, Seoul (KR)

(72) Inventors: Sanghoon Moon, Gyeonggi-do (KR); Kyoungbum Kim, Gyeonggi-do (KR); Ki Nam Kim, Gyeonggi-do (KR); Hyoungjun Cho, Seoul (KR); Yeonho Kim, Gyeonggi-do (KR); Jung Shik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 55 days.

(21) Appl. No.: 14/303,015

(22) Filed: Jun. 12, 2014

(65) Prior Publication Data

US 2015/0171677 A1    Jun. 18, 2015

(30) Foreign Application Priority Data

Dec. 18, 2013  (KR) .................... 10-2013-0158574

(51) Int. Cl.
   *H02K 1/27* (2006.01)
   *H02K 21/14* (2006.01)

(52) U.S. Cl.
   CPC .......... *H02K 1/2706* (2013.01); *H02K 1/276* (2013.01); *H02K 21/14* (2013.01); *H02K 2201/03* (2013.01)

(58) Field of Classification Search
   CPC ...... H02K 1/2706; H02K 1/276; H02K 21/14; H02K 2201/03
   USPC .................................................. 310/156.53
   See application file for complete search history.

(56) References Cited

U.S. PATENT DOCUMENTS

| | | | | |
|---|---|---|---|---|
| 6,340,857 B2* | 1/2002 | Nishiyama | ............ | H02K 1/276 310/156.21 |
| 6,359,359 B1* | 3/2002 | Miura | .................... | H02K 1/276 310/156.08 |
| 6,703,743 B2* | 3/2004 | Kaneko | .................. | H02K 1/276 310/156.02 |
| 8,756,793 B2* | 6/2014 | Doi | ...................... | H02K 1/2766 29/596 |
| 2004/0145263 A1* | 7/2004 | Kojima | .................. | H02K 1/276 310/156.23 |
| 2007/0017601 A1* | 1/2007 | Miyata | ..................... | B22F 3/24 148/105 |

FOREIGN PATENT DOCUMENTS

| | | |
|---|---|---|
| EP | 1746611 A1 | 1/2007 |
| EP | 2131474 | 12/2009 |
| EP | 2348518 A1 | 7/2011 |
| JP | 2001086671 A | 3/2001 |

(Continued)

OTHER PUBLICATIONS

Extended European Search Report for European Patent Application No. 14172183.7, dated Apr. 26, 2016, 8 pages.

*Primary Examiner* — Hanh Nguyen
*Assistant Examiner* — Leda Pham
(74) *Attorney, Agent, or Firm* — Mintz Levin Cohn Ferris Glovsky and Popeo, P.C.; Peter F. Corless

(57) ABSTRACT

An interior permanent magnet synchronous motor includes a stator a rotor disposed with a space between the stator and the rotor, and a plurality of permanent magnets embedded in the rotor. In particular, a plurality of slits are formed in one side surface of the permanent magnet in a rotation direction of the rotor at equal intervals.

12 Claims, 4 Drawing Sheets

(56) References Cited

FOREIGN PATENT DOCUMENTS

| JP | 2004180460 A | 6/2004 |
| JP | 2004-260951 A | 9/2004 |
| JP | 2009261203 A | 11/2009 |
| KR | 10-1193827 | 10/2012 |
| WO | 2010/052862 A1 | 5/2010 |

* cited by examiner

INTERIOR PERMANENT MAGNET SYNCHRONOUS MOTOR

CROSS-REFERENCE TO RELATED APPLICATION

This application claims priority to and the benefit of Korean Patent Application No. 10-2013-0158574 filed in the Korean Intellectual Property Office on Dec. 18, 2013, the entire contents of which are incorporated herein by reference.

BACKGROUND OF THE INVENTION (a) Field of the Invention

The present invention relates to an interior permanent magnet synchronous motor, and more particularly, to permanent magnets that are embedded inside a rotor.

(b) Description of the Related Art

In general, a hybrid vehicle or an electric vehicle, often referred to as an environmentally-friendly vehicle, is driven typically by an electric motor (hereinafter, referred to as a "drive motor") that produces torque from electrical energy.

Hybrid vehicles are capable of being driven in an electric vehicle (EV) mode, (that is a pure electric vehicle mode which uses only power from the drive motor to operate the vehicle), or in a hybrid electric vehicle (HEV) mode, (using both torque from an engine and torque from the drive motor as power) in order to reduce the amount of emissions which the vehicle produces and decrease fuel consumption. An electric vehicle, on the other hand, is driven using only torque from the drive motor as power and has no other power source.

The drive motor, which is used as a power source for these environmentally-friendly vehicles, is often a permanent magnet synchronous motor (PMSM). The permanent magnet synchronous motor has a stator, a rotor which is disposed to have a predetermined air gap with the stator, and permanent magnets which are installed to the rotor.

Depending on a method of installing the permanent magnets to the rotor, there are for the most part two types of permanent magnet synchronous motors, a surface permanent magnet motor (SPMM) in which the permanent magnets are installed on a surface of the rotor and an interior permanent magnet synchronous motor (IPMSM) in which the permanent magnets are embedded in the rotor.

The surface permanent magnet motor does not produce reluctance torque because a saliency ratio, which is a difference in inductance between a D-axis and a Q-axis, is zero (the D-axis inductance and the Q-axis inductance are the same). However, the interior permanent magnet synchronous motor advantageously produces reluctance torque due to its saliency ratio, and thus the interior permanent magnet synchronous motor is more widely applied as a drive motor for a hybrid vehicle, an electric vehicle, or an elevator that requires high efficiency and output density.

In order to allow the permanent magnet synchronous motor to exhibit maximum performance under a restricted layout condition, it is necessary to maximize performance of the permanent magnets. Here, neodymium (Nd) in the permanent magnet improves intensity of the permanent magnet, and dysprosium (Dy) improves tolerance against high-temperature demagnetization.

However, these rare earth resources (Nd, Dy), which are constituents of the permanent magnet, are restrictively buried in some countries, such as China, and thus are very expensive, and fluctuation in their prices is significant.

Recently, in order to cope with China's restrictions on rare earth resources, vehicle manufacturers have accelerated efforts to reduce usage of rare earth elements in the drive motor for an environmentally-friendly vehicle.

However, when a rare earth permanent magnet, which is applied to the drive motor for an environmentally-friendly vehicle, receives an opposing magnetic field that is too high for the magnet itself to withstand at a high temperature, irreversible demagnetization occurs in which magnetic intensity is lost.

This irreversible demagnetization occurs on a surface of the permanent magnet, which is affected by the opposing magnetic field due to a stator coil, that is, a rotor air gap direction surface that is directed toward the stator. This means that among the surfaces of the permanent magnet, the rotor air gap direction surface (i.e., the area between the outer surface of the rotor and the inner surface of the stator) is vulnerable to the irreversible demagnetization.

In addition, when the drive motor is continuously operated, an internal temperature of the permanent magnet increases due to an eddy-current loss, and in general, a temperature of the rotor air gap direction surface of the permanent magnet is also significantly increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an interior permanent magnet synchronous motor which may increase coercive force of a rotor air gap direction surface of a permanent magnet which is vulnerable to irreversible demagnetization, and reduce an eddy-current loss in the permanent magnet.

In addition, the present invention has been made in an effort to provide an interior permanent magnet synchronous motor which may improve manufacturability of a rotor by providing directionality to a rotor air gap direction surface of a permanent magnet (that surface of the rotor that faces a surface of the stator).

An exemplary embodiment of the present invention provides an interior permanent magnet synchronous motor including: a stator; a rotor disposed so that there is a gap between the stator and the rotor; and a plurality of permanent magnets which are embedded in the rotor. In particular, each of the plurality of magnets includes plurality of slits that are formed on one side surface of the permanent magnet in a rotation direction of the rotor at equal intervals (i.e., in a formed in a direction perpendicular to the insertion direction of the permanent magnet.

In addition, in the interior permanent magnet synchronous motor according to the exemplary embodiment of the present invention, the slits may be formed in an air gap direction surface of the permanent magnet (i.e., a surface disposed toward the stator). That is, each of these slits each may be formed in a direction perpendicular to a direction in which the permanent magnet is inserted into the rotor.

In addition, in the interior permanent magnet synchronous motor according to the exemplary embodiment of the present invention, the slits may be formed at equal intervals in along a direction in which the permanent magnet is inserted into the rotor.

In addition, in the interior permanent magnet synchronous motor according to the exemplary embodiment of the present invention, the slit may be formed to have a depth that is 50% or more of a thickness of the permanent magnet.

In addition, in the interior permanent magnet synchronous motor according to the exemplary embodiment of the present invention, a coercive force of the air gap direction surface and both edge surfaces of the permanent magnet may be greater than coercive force of the remaining surfaces.

In addition, in the interior permanent magnet synchronous motor according to the exemplary embodiment of the present invention, the air gap direction surface and both the edge surfaces of the permanent magnet may be coated with a grain boundary diffused material.

In addition, in the interior permanent magnet synchronous motor according to the exemplary embodiment of the present invention, the synchronous motor may be an interior rotor type in which the rotor is disposed inside the stator.

According to the exemplary embodiments of the present invention, the slits are formed in the air gap direction surface of the permanent magnet that is embedded inside the rotor, and the air gap direction surface and both the edge surfaces of the permanent magnet are coated with the a grain boundary diffused material, thereby increasing the coercive force of the air gap direction surface of the permanent magnet which is affected by an opposing magnetic field due to a stator coil.

Therefore, in the exemplary embodiment of the present invention, the occurrence of irreversible demagnetization of the permanent magnet may be minimized, and residual magnetic flux density and maximum energy deterioration may be suppressed.

In addition, in the exemplary embodiment of the present invention, the slits are formed in the air gap direction surface of the permanent magnet at equal intervals to reduce an eddy-current loss in the permanent magnet, thereby suppressing an increase in temperature at the air gap direction surface, and maintaining the temperature of the permanent magnet to a design reference temperature or less.

In addition, in the exemplary embodiment of the present invention, instead of configuring the permanent magnet itself with a constituent having a high coercive force, the a grain boundary diffused material is formed on a surface (i.e., the air gap direction surface or surface closest to the stator) and both the edge surfaces of the permanent magnet, and the plurality of slits are formed in the permanent magnet, thereby reducing usage of rare earth elements that are comparatively expensive. Accordingly, in the exemplary embodiment of the present invention, costs and production costs of the permanent magnet may be reduced.

Moreover, in the exemplary embodiment of the present invention, the slits are formed in the air gap direction surface of the permanent magnet to provide directionality to the permanent magnet, thereby more improving assembly performance of the rotor.

BRIEF DESCRIPTION OF THE DRAWINGS

The drawings are intended to be used as references for describing the illustrative exemplary embodiments of the present invention, and the accompanying drawings should not be construed as limiting the technical spirit of the present invention.

DETAILED DESCRIPTION OF THE EMBODIMENTS

Figure 1:
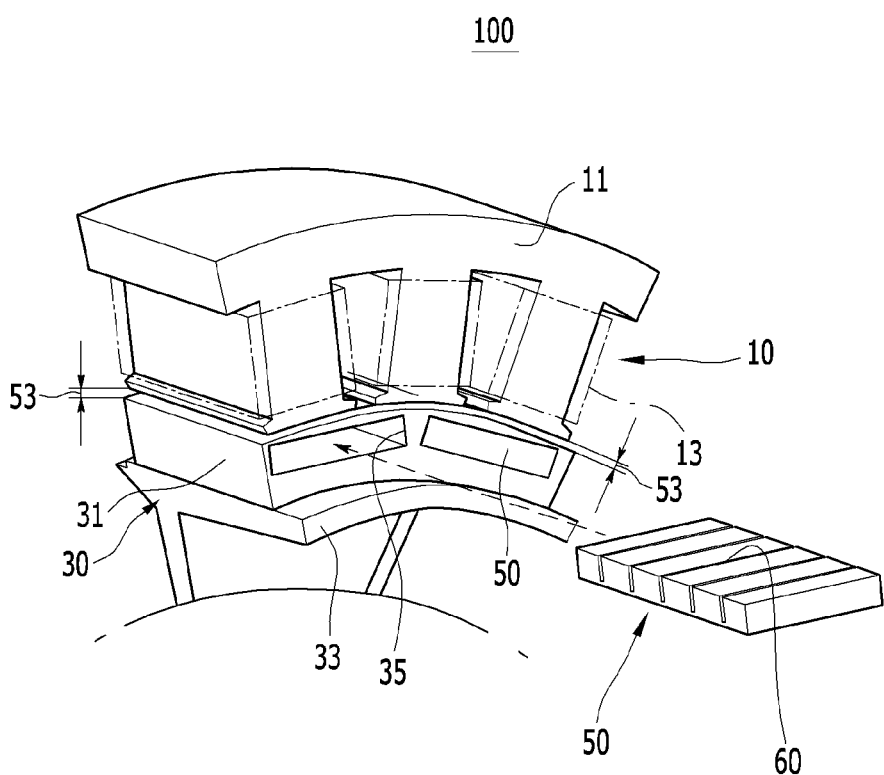
FIG. 1 is a partially cut-out perspective view illustrating an interior permanent magnet synchronous motor according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification, unless explicitly described to the contrary, the word "comprise" and variations such as "comprises" or "comprising", will be understood to imply the inclusion of stated elements but not the exclusion of any other elements.

In addition, "unit", "means", "part", "member", or the like, which is described in the specification, means a unit of a comprehensive configuration that performs at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a partially cut-out perspective view illustrating an interior permanent magnet synchronous motor according to an exemplary embodiment of the present invention. Referring to FIG. 1, an interior permanent magnet synchronous motor (IPMSM) 100 according to an exemplary embodiment of the present invention may be applied to an environmentally-friendly vehicle such as a hybrid vehicle that produces drive power from electrical energy.

The interior permanent magnet synchronous motor 100 includes a stator 10, and a rotor 30 which is disposed to have an air gap between the stator 10 and the rotor 30. Additionally, a plurality of permanent magnets 50 are installed within the rotor 30.

Here, the stator 10 includes a stator core 11 in which a plurality of sheets of steel plates are stacked, and stator coils 13 are wound around the stator core 11. The rotor 30 includes a rotor core 31 in which a plurality of sheets of steel plates are stacked. The rotor core 31 is fixed to and installed on an outer circumferential surface of a shaft 33 by a rotor fixing means. Further, the permanent magnets 50 are installed by being inserted into insertion holes 35 of the rotor core 31 in an embedding manner.

Moreover, the interior permanent magnet synchronous motor 100 according to the exemplary embodiment of the present invention may be applied to an interior rotor type synchronous motor in which the rotor 30 is disposed inside the stator 10, and an exterior rotor type synchronous motor in which the rotor 30 is disposed outside the stator 10.

It will be described as an example that the exemplary embodiment of the present invention is applied to the interior rotor type synchronous motor in which the stator 10 is provided outside the rotor 30, and the rotor 30 is rotated inside the stator 10. However, it should not be understood that the scope of the present invention is necessarily limited thereto, and it is noted that the technical spirit of the present invention may also be applied to the exterior rotor type synchronous motor.

The interior permanent magnet synchronous motor 100 according to the exemplary embodiment of the present invention has a structure that may increase coercive force of a rotor air gap direction surface which is vulnerable to irreversible demagnetization of the permanent magnet 50, and reduce an eddy-current loss inside the permanent magnet 50.

In addition, the exemplary embodiment of the present invention provides the interior permanent magnet synchronous motor 100 that may provide directionality to the rotor air gap direction surface of the permanent magnet 50, and improve manufacturability of the rotor.

To this end, the interior permanent magnet synchronous motor 100 according to the exemplary embodiment of the present invention may have the permanent magnet 50 which has a plurality of slits 60 formed in one side surface thereof, and is embedded in the insertion hole 35 of the rotor core 31.

Figure 2:
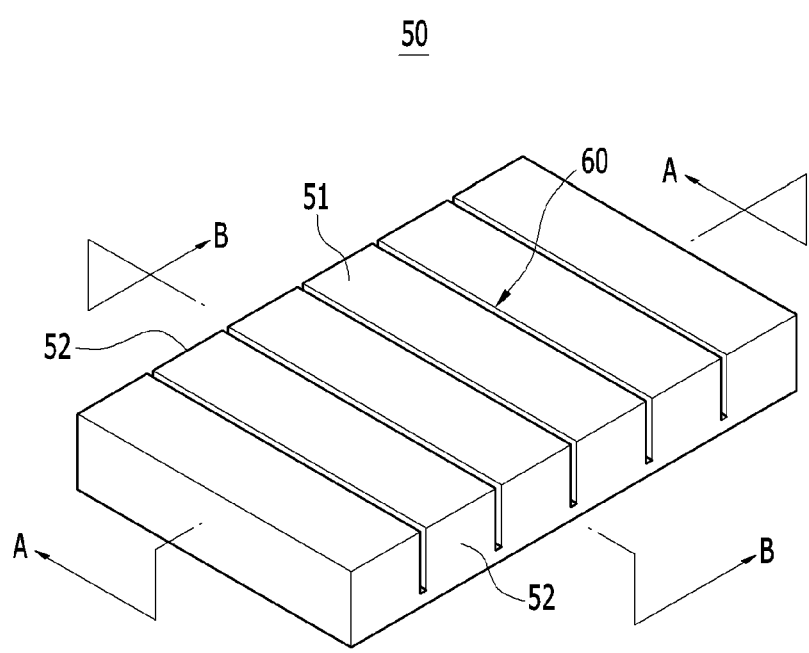
FIG. 2 is a perspective view illustrating a permanent magnet that is applied to the interior permanent magnet synchronous motor according to the exemplary embodiment of the present invention.
Figure 3:
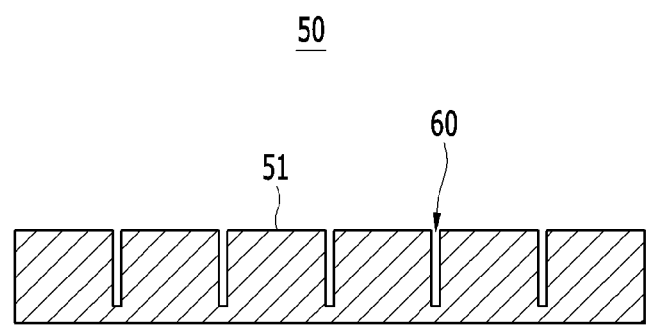
FIG. 3 is a cross-sectional configuration diagram taken along line A-A of FIG. 2, which illustrates the permanent magnet that is applied to the interior permanent magnet synchronous motor according to the exemplary embodiment of the present invention.

FIG. 2 is a perspective view illustrating the permanent magnet that is applied to the interior permanent magnet synchronous motor according to the exemplary embodiment of the present invention, and FIG. 3 is a cross-sectional configuration diagram taken along line A-A of FIG. 2, which illustrates the permanent magnet that is applied to the interior permanent magnet synchronous motor according to the exemplary embodiment of the present invention.

Referring to FIGS. 2 and 3 together with FIG. 1, in the exemplary embodiment of the present invention, the slits 60 of the permanent magnet 50 may be formed to be spaced apart from each other at an equal interval in an air gap direction surface 51. The air gap direction surface 51 is a surface of the permanent magnet 50 which is directed toward the air gap (space) 53 between the stator 10 and the rotor 30.

The reason why the slits 60 are formed in the air gap direction surface 51 of the permanent magnet 50, as described above, is to increase coercive force of the air gap direction surface 51 that is vulnerable to irreversible demagnetization, because the irreversible demagnetization occurs at the air gap direction surface 51 of the permanent magnet 50 which is affected by an opposing magnetic field due to the stator coil 13.

The slits 60 each may be formed along and in the air gap direction surface 51 of the permanent magnet 50 in a rotation direction of the rotor 30, and may be formed in a direction perpendicular to a direction in which the permanent magnet 50 is inserted into the rotor 30. That is, the slits 60 may be formed at equal intervals in a direction in which the permanent magnet 50 is inserted into the insertion hole 35 of the rotor core 31. In this case, the slits 60 are formed to have a depth that is 50% or more of a thickness of the permanent magnet 50 in a direction from the air gap (space) between the stator 10 and the rotor 30 to a center of the rotor 30.

Meanwhile, in the exemplary embodiment of the present invention, the permanent magnet 50 is formed so that coercive force of the air gap direction surface 51 and both edge surfaces 52 is greater than coercive force of the remaining surfaces. Here, based on FIG. 2, the air gap direction surface 51 refers to an upper surface, both the edge surfaces 52 refers to both left and right surfaces, and the remaining surfaces refer to front and rear edge surfaces and a lower surface of the permanent magnet.

Figure 4:
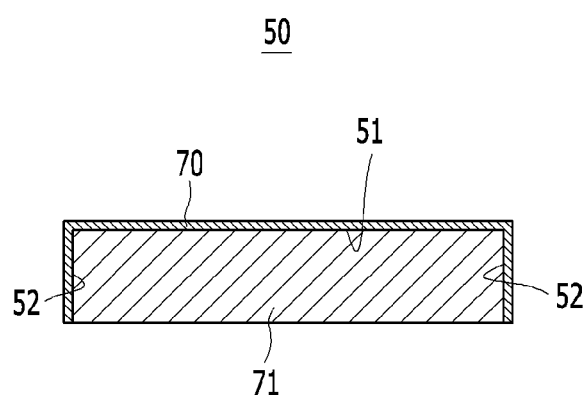
FIG. 4 is a cross-sectional configuration diagram taken along line B-B of FIG. 2, which illustrates the permanent magnet that is applied to the interior permanent magnet synchronous motor according to the exemplary embodiment of the present invention.

To this end, as illustrated in FIG. 4, the permanent magnet 50 may be formed by coating the air gap direction surface 51 and both the edge surfaces 52 with a grain boundary diffused material 70 (i.e., by applying the material with a grain boundary diffusion method). Here, the grain boundary diffusion method is a method of coating a surface of a magnet sintered body 71 with a compound as the coating material 70, and heating the coating material 70 to a temperature at which the compound is diffused. This compound may include, for example, Rhodium ($R_H$) powder.

That is, the grain boundary diffusion method is a method in which the $R_H$ powder enters the interior of the sintered body 71 through grain boundaries of crystal grains which are present in the sintered body 71, and the $R_H$ powder is diffused on crystal grain surfaces of the sintered body 71. Because the aforementioned grain boundary diffusion method associated with the manufacture of the permanent magnet is a publicly known technology that is widely known in the corresponding industrial field, a more detailed description thereof will be omitted in the present specification.

Therefore, according to the interior permanent magnet synchronous motor 100 according to the exemplary embodiment of the present invention, which is configured as described above, the slits 60 are formed at equal intervals in the rotation direction of the rotor 30 in the air gap direction surface of the permanent magnet 50 that is embedded inside the rotor 30, and the air gap direction surface and both the edge surfaces of the permanent magnet 50 are coated with the grain boundary diffused material 70 by the grain boundary diffusion method.

Accordingly, in the exemplary embodiment of the present invention, it is possible to increase coercive force of the air gap direction surface of the permanent magnet 50 which is affected by the opposing magnetic field due to the stator coil 13, thereby minimizing the occurrence of irreversible demagnetization of the permanent magnet 50, and suppressing residual magnetic flux density and maximum energy deterioration.

In addition, in the exemplary embodiment of the present invention, unlike the existing rotation direction separation manner, the slits 60 are formed in the air gap direction surface of the permanent magnet 50 at equal intervals to reduce an eddy-current loss in the permanent magnet 50, thereby suppressing an increase in temperature at the air gap direction surface, and maintaining the temperature of the permanent magnet 50 to a design reference temperature or less.

Further, in the exemplary embodiment of the present invention, instead of configuring the permanent magnet 50 itself with a constituent having a high coercive force, the grain boundary diffused material 70 is coated on just the air gap direction surface and both the edge surfaces of the permanent magnet 50 by the grain boundary diffusion method, and the plurality of slits 60 are formed in the permanent magnet 50, thereby reducing usage of rare earth elements that are comparatively expensive.

Accordingly, in the exemplary embodiment of the present invention, costs and production costs of the permanent magnet 50 may be reduced. Moreover, in the exemplary embodiment of the present invention, the slits 60 are formed in the air gap direction surface of the permanent magnet 50 to provide directionality to the permanent magnet 50, thereby improving manufacturability of the rotor 30.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10 . . . Stator
11 . . . Stator core
13 . . . Stator coil
30 . . . Rotor
31 . . . Rotor core
33 . . . Shaft
35 . . . Insertion hole
50 . . . Permanent magnet
51 . . . Air gap direction surface
52 . . . Edge surface
53 Air gap
60 . . . Slit
70 . . . Coating material
71 . . . Sintered body

What is claimed is:

1. An interior permanent magnet synchronous motor comprising:
a stator;
a rotor disposed to have an air gap between the rotor and the stator; and
a plurality of permanent magnets embedded in the rotor,
wherein a plurality of slits are formed in a first side surface of each of the permanent magnets at equal intervals,
wherein all of the slits formed in the first side surface are extended in a rotation direction of the rotor,
wherein a coercive force of the first side surface and both edge surfaces of each of the permanent magnets is greater than a coercive force of a second side surface of each of the permanent magnets, and the second side surface is opposite to the first side surface, and
wherein the first side surface and both the edge surfaces of each of the permanent magnets are coated with a grain boundary diffused material and
the grain boundary diffused material is absent in the second side surface.

2. The interior permanent magnet synchronous motor of claim 1, wherein:
the first side surface of each of the permanent magnets faces the air gap.

3. The interior permanent magnet synchronous motor of claim 1, wherein:
the slits are extended in a direction perpendicular to a direction in which the permanent magnet is inserted into the rotor.

4. The interior permanent magnet synchronous motor of claim 3, wherein:
the slits are formed at equal intervals in a direction in which the permanent magnets are is inserted into the rotor.

5. The interior permanent magnet synchronous motor of claim 1, wherein:
each of the slits is formed to have a depth that is 50% or more of a thickness of each of the permanent magnets.

6. The interior permanent magnet synchronous motor of claim 1, wherein:
the synchronous motor is an interior rotor type in which the rotor is disposed inside of the stator.

7. An electric motor comprising:
a stator;
a rotor disposed with an space between the stator and the rotor and having a plurality of insertion holes; and
a plurality of permanent magnets inserted in the insertion holes of the rotor,
wherein a plurality of slits are formed in a first side surface of each of the permanent magnets and
wherein all of the slits formed in the first side surface are extended in a direction perpendicular to an insertion direction of the permanent magnets into the insertion holes,
wherein the first side surface and both edge surfaces of each of the permanent magnets are coated with a grain boundary diffused material, and
wherein the grain boundary diffused material is absent in a second side surface of each of the permanent magnets, the second side surface is opposite to the first side surface.

8. The electric motor of claim 7, wherein:
the first side surface is an upper surface or a lower surface of each of the permanent magnet.

9. The electric motor of claim 7, wherein:
the slits are formed at equal intervals.

10. The electric motor of claim 7, wherein:
each of the slits is formed to have a depth that is 50% or more of a thickness of each of the permanent magnet.

11. The electric motor of claim 7, wherein:
a coercive force of the first side surface and both the edge surfaces of each of the permanent magnets is greater than a coercive force of a second side surface of each of the permanent magnets, and
the second side surface is opposite to the first side surface.

12. The electric motor of claim 7, wherein:
the rotor is disposed inside of the stator.

* * * * *